Figure 1:
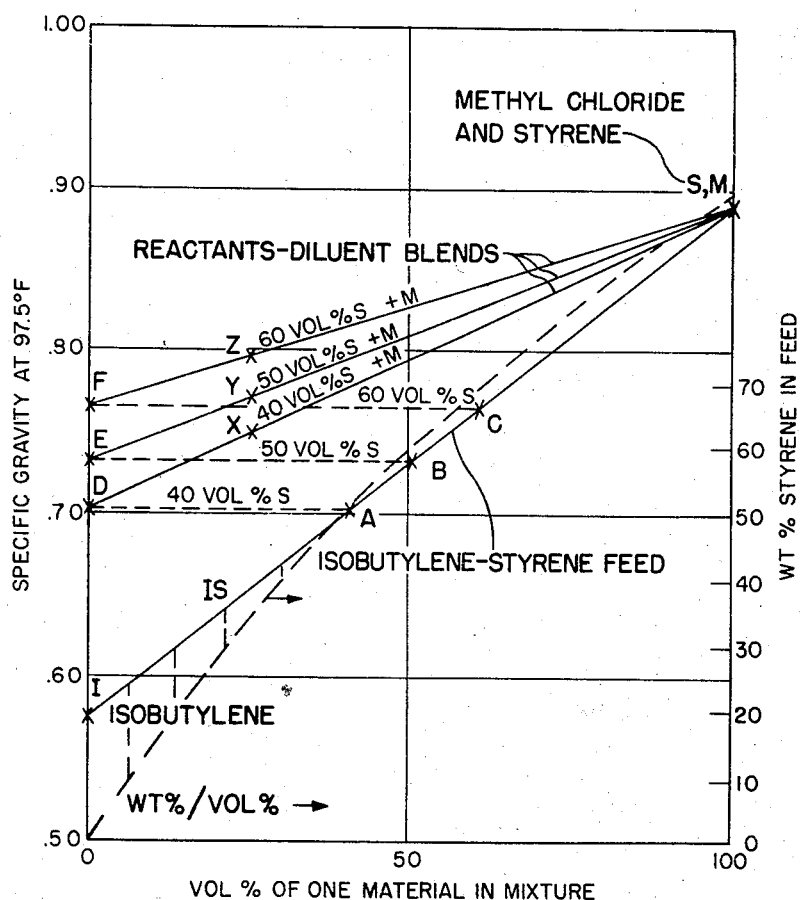

Sept. 16, 1958          D. S. ALEXANDER ET AL          2,852,500
            CONTROLLING FEED FOR STYRENE-ISOBUTYLENE
              COPOLYMER MANUFACTURE BY ADJUSTING
                        SPECIFIC GRAVITY
Filed June 1, 1954                              2 Sheets-Sheet 1

DOUGLAS S. ALEXANDER  *INVENTORS*
IAN R. FRASER

BY  *W. H. Smyers*  ATTORNEY

DOUGLAS S. ALEXANDER INVENTORS
IAN R. FRASER

United States Patent Office 2,852,500
Patented Sept. 16, 1958

2,852,500

CONTROLLING FEED FOR STYRENE-ISOBUTYLENE COPOLYMER MANUFACTURE BY ADJUSTING SPECIFIC GRAVITY

Douglas Sadler Alexander and Ian Robert Fraser, Sarnia, Lambton, Ontario, Canada, assignors to Esso Research and Engineering Company, a corporation of Delaware Application June 1, 1954, Serial No. 433,778

3 Claims. (Cl. 260—88.1)

This invention relates to an improved method of controlling the mixture of two reactants and inert diluent in the manufacture of high molecular weight copolymers, particularly as typified by the manufacture of styrene-isobutylene copolymers in the presence of methyl chloride as diluent, by Friedel-Crafts polymerization at temperatures below 0° C.

The type of copolymerization involved in the present invention comes under the general disclosures of U. S. Patent 2,274,749, and preferably under the approved polymerization process disclosed in U. S. Patent 2,643,993.

In genreal, the process involves copolymerizing a monoolefinic compound containing a cyclic nucleus, such as styrene, and an alkene of 3 to 5 carbon atoms, such as isobutylene, in the presence of a lower alkyl halide diluent, at a temperature below about 0° C. with a Friedel-Crafts catalyst, such as aluminum chloride. The process may be carried out either batchwise or continuously, and the resulting copolymer may be recovered by any desired means, one suitable method being to inject the cold reaction mixture consisting of polymer dissolved in the inert diluent, together with unreacted raw materials (if any) and residual catalyst (if any), into hot water, in order to flash off volatile solvent, inactivate residual catalyst, that produce a slurry of fine polymer particles suspended in water.

Various equivalent materials may be used. For instance, instead of styrene, one may use p-methyl styrene, p-ethyl styrene, p-chlor styrene, or various methyl, ethyl or other lower alkyl homologs of styrene, or various ring-halogenated styrene homologs, or other cyclic materials also which polymerize in similar manner with isobutylene, such as vinyl naphthalene, indene, dihydronaphthalene, etc. Instead of isobutylene, one may use other lower olefins, preferably isoolefins such as methyl-2-butene-1; the lower normal olefins do not polymerize quite as readily by the low temperature Friedel-Crafts technique, but may be used if desired, particularly with higher catalyst concentration. Although methyl chloride is the preferred lower alkyl halide for use as diluent-solvent, one may also use ethyl chloride, or even propyl chloride, or some of the low boiling fluorides. As catalyst, the preferred material is aluminum chloride dissolved in methyl chloride, but one may also use boron fluoride or other active Friedel-Crafts catalyst, either alone, or dissolved in a suitable solvent.

In carrying out the polymerization, it is of course possible in a laboratory when working with small quantities, to obtain quite accurate control of the proportions of the styrene and isobutylene reactants, as well as the methyl chloride diluent, by measuring these materials in the liquid phase at atmospheric pressure, either at cold storage temperature or even at the colder polymerization temperature, and measuring the amounts of materials, either by weight or by volume. However, when carrying out this process on a large scale, such as making 25 or 50 or more tons per day, of the copolymer, it is found more practical to measure the desired proportions of reactants and diluents at higher temperature under pressure, for instance, at some temperature between about 50 and 120° F. and under a pressure of about 40 to 140 p. s. i. g., which, for instance, may be the temperature and pressure under which such materials are recovered after condensation of the vapors from the polymer recovery operation. However, when pumping large volumes of these liquids into a large mixing drum or tank for use as feed reservoir for a number of hours of continuous polymerization, it has been found difficult to get accurate control over the exact proportions of styrene and isobutylene, and consequently difficult to make a final copolymer having a percent combined styrene within narrow limits or specifications of the desired percent styrene; and it is also difficult to obtain accurate control of the ratio of reactants to diluent before polymerization, with a resultant undesirably wide variation in the molecular weight of the resulting polymer.

Now, according to the present invention, it has been found possible to obtain surprisingly accurate control of both the proportions of styrene and isobutylene, as well as the proportion of reactants to diluent, by first mixing the styrene and isobutylene and determining specific gravity at a suitable temperature, preferably 97.5° F., to obtain approximately the desired proportions of these two materials, and then adjusting the proportions thereof until the feed mixture has the specific gravity of the desired reactant mixture, at that particular temperature, and then mixing the resultant reactant feed with the methyl chloride diluent in desired proportions, preferably also making a final adjustment of the reactants-diluent proportions until the blend has the specific gravity of the desired final blend at that same temperature. This exactly controlled blend may then be cooled down to the desired polymerization temperature, and catalyst added to effect polymerization.

The invention will be illustrated as applied specifically to the copolymerization of styrene and isobutylene in the presence of methyl chloride diluent, and measuring the quantities of these materials at 97.5° F. under pressure, for preparing the polymerization feed blend. The reason for selecting 97.5° F. for this measuring temperature is that methyl chloride and styrene have precisely the same specific gravity at that temperature. The mixing temperature is unimportant, and can be in any practical range, providing the specific gravity determination is made at 97.5° F.

Figure 2:
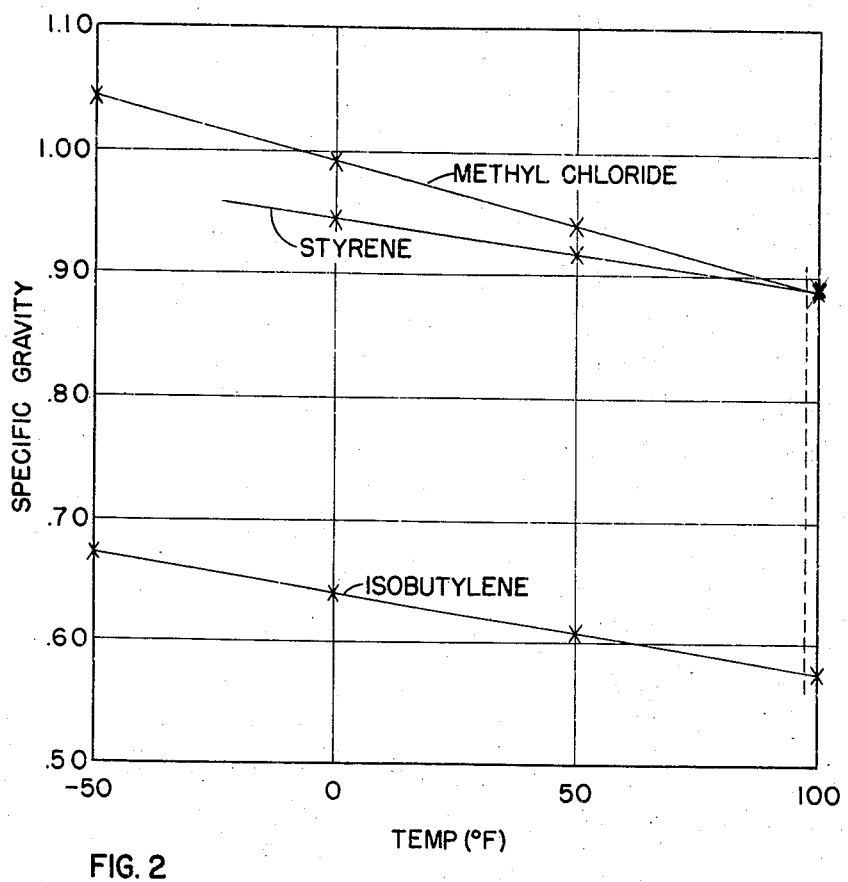

As an aid to the description and understanding of the invention, two drawings are submitted herewith, of which Figure 1 is a chart on which are plotted the specific gravity of mixtures of various amounts of styrene in styrene-isobutylene feeds, and various amounts of such styrene-isobutylene feeds in methyl chloride diluent; and Figure 2 is a chart showing the specific gravity of the various separate materials over the temperature range of −50° F. to +100° F.

The accuracy in control of composition and molecular weight of the polymer, enabled by the present invention, accrues from the fact that isobutylene has a much lower specific gravity than either styrene or methyl chloride. Accordingly, mixtures of styrene and isobutylene vary in specific gravity directly in proportion to the volume content of styrene, and, in the range of 0–100 vol. percent styrene, the mixtures have a relatively great change or increment in specific gravity, of about .003 for each additional vol. percent of styrene, in the styrene-isobutylene feed mixture.

Table 1 herebelow gives the specific gravity (at 97.5° F.) for various mixtures of styrene and isobutylene ranging from 0 to 100 vol. percent styrene content, and shows corresponding wt. percent.

TABLE 1

*Specific gravity of mixtures of styrene and isobutylene at 97.5° F.*

| Composition of Feed | | | | Specific Gravity (at 97.5 °F.) |
|---|---|---|---|---|
| Vol. percent | | Wt. percent | | |
| Styrene | Isobutylene | Styrene | Isobutylene | |
| 0 | 100 | 0 | 100 | .575 |
| 40 | 60 | 50.8 | 49.2 | .701 |
| 50 | 50 | 60.7 | 39.3 | .734 |
| 60 | 40 | 69.9 | 30.1 | .765 |
| 100 | 0 | 100 | 0 | .891 |

Referring to Figure 1 of the accompanying drawings, the line IS represents these same specific gravity figures for styrene-isobutylene feeds on a vol. percent basis. Thus the line IS starts at the point I near the lower left corner of the chart, representing a specific gravity of 0.575 for a liquid consisting of isobutylene alone (0% styrene) and then the line extends diagonally toward the upper right corner of the chart to the point S, M (representing both styrene and methyl chloride, which each have the same specific gravity of 0.891 at the temperature 97.5° F.). Intermediate points on the line IS, such as the points A, B and C represent the specific gravities, respectively, of mixtures containing 40, 50 and 60 vol. percent styrene. Thus a liquid consisting of 50 vol. percent styrene and 50 vol. percent isobutylene has a specific gravity of 0.734.

Therefore, the first step of the present invention consists in mixing styrene and isobutylene together in a mixing drum or tank at any suitable temperature, of about 70 to 120° F., under sufficient pressure to maintain the constituents in the liquid phase, preferably about 100 p. s. i. g. for the temperature of 97.5° F. This initial mixing may be accomplished in any desired manner, such as by charging into the tank, by gravity or pumping, the volumes of liquid isobutylene and styrene which are estimated to give approximately the desired correct proportion. When operating on a large scale, it is difficult or impractical to use exact pre-weighed amounts, or even predetermined exact volumes, and if pumps or metering devices are relied upon as delivering certain predetermined volume per minute, such equipment generally does not have sufficient accuracy to give the control desired. So, as soon as the approximately correct mixture has been made up in sufficiently large volume, e. g. 1000 gallons, or 10,000 gallons, or more, according to the size of operations involved, and the liquids have been thoroughly mixed by suitable agitation, the temperature of the mixture is preferably adjusted to exactly 97.5° F., and the specific gravity is then determined, either manually or automatically. If the specific gravity is found to be slightly lower than desired (for instance if it is 0.732 instead of 0.734, then a small amount of styrene, as estimated to be required, is added to the mixture, agitated, and the mixture is again tested for specific gravity. Conversely, if the specific gravity is found to be slightly higher than that desired, a proportionate amount of isobutylene may be added. Although one adjustment is generally all that is needed, the mixture may be adjusted several times if desired for extreme accuracy.

The next step in the present invention is to mix methyl chloride with the above-prepared accurate styrene-isobutylene feed in order to obtain a final blend containing the desired proportion, generally about 20 to 40 wt. percent, preferably about 25 to 35 wt. percent of reactive hydrocarbon (styrene-isobutylene) feed, the balance being methyl chloride. This corresponds roughly to 1 to 5 volumes of diluent per volume of reactants. The selection of the desired reactants-diluent concentration will depend on the desired balance of several factors. Generally the higher reactant concentration tends to produce higher molecular weight polymer, but it also produces a more viscous solution, both due to the higher concentration of reactants and less diluent, and also due to the higher molecular weight of the polymer formed.

Table 2 herebelow gives the specific gravities (at 97.5° F.) for three different feed blends of 40, 50 and 60 vol. percent of styrene respectively in isobutylene, admixed in concentrations ranging from 20 to 40 vol. percent in methyl chloride diluent. For instance, the table shows that in making a copolymer from a feed of 50 vol. percent styrene and 50 vol. percent isobutylene, using 75 vol. perecent feed and 25 vol. percent methyl chloride dilent, which is found very suitable for this operation, the specific gravity of the resulting blend should be 0.771.

TABLE 2

*Specific gravity of blends of styrene-isobutylene feeds with methyl chloride at 97.5° F.*

| Composition of Reactants - Diluent Blend (Vol. percent) | | Specific Gravity (at 97.5° F.) of Feed-Diluent Blend | | |
|---|---|---|---|---|
| Methylchloride | Hydrocarbons | Vol. percent Styrene in Feed | | |
| | | 40 | 50 | 60 |
| 20 | 80 | .740 | .763 | .790 |
| 25 | 75 | .750 | .771 | .797 |
| 30 | 70 | .760 | .780 | .803 |
| 35 | 65 | .769 | .788 | .810 |
| 40 | 60 | .778 | .797 | .816 |

On the other hand, if it is desired to make a similar copolymer using a 70 vol. percent hydrocarbon feed, the specific gravity of feed-diluent blend should be 0.780.

Referring again to Figure 1 of the accompanying drawings, the lines marked "60 vol. percent S+M," "50 vol. percent S+M," and "40 vol. percent S+M," represent the specific gravities of various concentrations of these three feeds in methyl chloride. The specific gravity of the plain feed is in each case shown at the left side of the chart, at the points marked D, E and F, respectively, representing 0% methyl chloride, while the other extremity of these three lines is in each case at the single points S, M at the upper right corner of the chart representing 100% methyl chloride, namely a specific gravity of 0.981 (this is also the specific gravity of styrene). The intermediate points such as X, Y and Z represent the specific gravities of intermediate concentrations, namely in this case 75 vol. percent of the hydrocarbon feed in 25 vol. percent of methyl chloride. Thus the point Y specifically shows that a mixture of 75 vol. percent of 50 vol. percent styrene feed in 25 vol. percent of methyl chloride should have a specific gravity of 0.771, as mentioned above in reference to Table 2.

Therefore, in carrying out the second step of the invention, either methyl chloride is added directly into the same mixing tank already containing the accurate mixture of styrene and isobutylene feed, or more preferably the methyl chloride and styrene-isobutylene feed are both charged into a different tank, and first mixed in approximately the desired proportions, tested for specific gravity, and adjusted as needed, by adding methyl chloride if it is too low, or adding styrene-isobutylene feed if it is too high.

When exactly the correct specific gravity is obtained, it means that the polymerization feed blend now contains exactly the desired proportion of styrene and isobutylene, and exactly the desired proportion of methyl chloride diluent. This blend is now ready for cooling down to the desired polymerization temperature, for instance, in the range of −100 to −150° F. to make copolymers of very high mol. wt., e. g. having an intrinsic viscosity above 0.5, and then polymerized by adding suitable catalyst such as a solution of aluminum chloride in methyl chloride, followed by recovery of polymer and recycling of methyl chloride and unreacted styrene and isobutylene (if any). Polymerizing at about −10° F. (−23° C.), the B. P. of methyl chloride, is desirable for making copolymer of moderate mol. wt., e. g. intrinsic viscosity 0.1–0.5.

Most of the above discussion of the invention was to explain how to carry it out under the preferred conditions, namely by doing the measuring and mixing at a temperatupre of 97.5° F. under suitable pressure. This, however, is not necessary; it is possible to carry out the invention by effecting the measurement of the reactants and diluent and testing their specific gravities at temperatures far below 97.5° F., or even substantially above, e. g. about 70 to 120° F. In such cases, however, since styrene and methyl chloride will have different specific gravities at any temperature other than 97.5° F., a chart such as the accompanying Figure 1 would have to be prepared on a slightly different basis. For instance, the line IS representing styrene-isobutylene feed, although starting at a point I, corresponding to the specific gravity of isobutylene at whatever temperature is used for the measurement, would go toward the upper corner of the chart to a point S representing the specific gravity of styrene at that temperature, and then the feed-diluent lines would start at the left of the chart at modified points D, E and F, representing the specific gravity of those three blends at the temperature involved, and they would meet at the upper right part of the chart at a new point M representing the specific gravity of methyl chloride at that temperature, but this point M would not be the same as the point S for styrene.

In order to facilitate the optional use of temperatures other than 97.5° F. for carrying out this invention, Table 3 is submitted herebelow, giving the specific gravities of isobutylene, styrene and methyl chloride at various temperatures (in 50° intervals) from 100° F. downward to −150° F. (which corresponds approximately to −100° C.). Specific gravities are not given for styrene for temperatures below 0° F., because this material has a melting point of −23° F. Methyl chloride freezes at −144° F. From this table it is observed that isobutylene increases in specific gravity from 0.572 at 100° F. down to about 0.725 at −150° F., while methyl chloride increases in specific gravity from 0.886 at 100° F. down to about 1.13 at −150° F., and styrene increases from a specific gravity of 0.890 at 100° F. to 0.943 at 0° F.

TABLE 3

*Specific gravity of isobutylene, styrene and methyl chloride at various temperatures*

| Temperature | | Specific Gravity | | |
|---|---|---|---|---|
| ° C. | ° F. | Isobutylene | Styrene | Methyl Chloride |
| 37.8 | 100 | .572 | .890 | 0.886 |
| 10.0 | 50 | .610 | .912 | 0.942 |
| −17.8 | 0 | .641 | 0.943 | 0.994 |
| −45.5 | −50 | .672 | (solid) | 1.043 |
| −73.3 | −100 | .700 | (solid) | 1.1092 |
| −100.1 | −150 | .725 | (solid) | solid |

For obtaining a better perspective in considering these specific gravity changes with temperatures, and to permit ready interpolation for temperatures in between the specific ones given in Table 3, that data is plotted graphically on the accompanying chart identified as Figure 2. In referring to that drawing, it is noted that the specific gravity of methyl chloride is represented by the upper line starting at the upper left corner of the chart and coming diagonally downward to the right. It is also observed that the styrene specific gravity line starts considerably lower than the methyl chloride line at the left of the chart meaning at low temperature, and then actually crosses the methyl chloride line at the extreme right of the chart at the temperature of 97.5° F. and at the specific gravity of 0.891. The specific gravity of liquid isobutylene is, of course much lower toward the bottom of the drawing. By drawing a vertical line anywhere on the chart through those three lines, one can readily obtain the specific gravity of each of those three materials at whatever temperature is desired, and then those specific gravity figures can be used for making a modified chart along the basis of Figure 1 for obtaining specific gravities of the mixtures, first of the styrene-isobutylene feed and then of reactants-diluent blend.

It is not intended that the invention be limited to the specific modification given here merely for illustration, but only by the appended claims in which it is intended to claim all novelty apparent in the invention as well as all modifications coming within the scope and spirit of the invention.

We claim:

1. A continuous process of manufacturing copolymers of about 40–70% of a vinyl aromatic compound selected from the group consisting of vinyl aromatic hydrocarbons and chlorinated vinyl aromatic hydrocarbons with about 60–30% of a $C_3$–$C_5$ iso-alkene containing a terminal methylene group, in the presence of an alkyl chloride diluent having substantially the same specific gravity as the aromatic compound at a specific elevated temperature level, which comprises continuously admixing the aromatic compound and the iso-alkene, regulating the temperature of the mixture formed to the above level and adjusting the volume flow rate of the components of the mixture so as to establish a predetermined specific gravity of said mixture; then blending said mixture with the alkyl chloride diluent, regulating the temperature of the blend formed to the above temperature level, and adjusting the volume flow rates of the components of said blend so as to establish a predetermined specific gravity of the resulting composition; the volume percent concentration of said aromatic compound, iso-alkene, and alkyl chloride diluent in said composition being a linear function of the specific gravity of the composition at the above elevated temperature level, and finally cooling the resulting composition to a temperature of about −100° F. to −200° F., and polymerizing the same with an Friedel-Crafts catalyst.

2. A continuous process of manufacturing copolymers of about 40 to 70% styrene with about 60 to 30% isobutylene in the presence of a methyl chloride diluent, having substantially the same specific gravity as styrene at about 97.5° F. which comprises, continuously admixing the styrene and the isobutylene, regulating the temperature of the mixture formed to about 97.5° F. and adjusting the volumes of the components of the mixture so as to establish a desired specific gravity to obtain a definite ratio of feed monomers, then blending said mixture with the methyl chloride diluent, regulating the temperature of the blend formed to the above temperature of about 97.5° F. and adjusting the volumes of the components of said blend so as to establish a desired specific gravity of the resulting composition to obtain a definite ratio of feed to diluent; the volume percent concentration of the styrene, isobutylene, and methyl chloride in said composition being a linear function of the specific gravity of the composition at the above elevated temperature of about 97.5°, and finally cooling the resulting composition to a temperature of about −100° F. to −200° F. and polymerizing the same with an added aluminum chloride catalyst.

3. A continuous process of manufacturing copolymers of about 40 to 70% of a vinyl aromatic hydrocarbon with about 60 to 30% of a $C_3$ to $C_5$ iso-alkene containing a terminal methylene group, in the presence of an alkyl halide diluent having substantially the same specific gravity as the aromatic hydrocarbon at a specific elevated temperature level of between about 70° and 120° F. which comprises continuously admixing the vinyl aromatic hydrocarbon and the $C_3$ to $C_5$ iso-alkene, regulating the temperature of the mixture formed to the said level, and adjusting the volumes of components of the mixture so as to establish a desired specific gravity to obtain a definite ratio of feed monomers, then blending said mixture with the alkyl halide diluent, regulating the temperature of the blend formed to the above temperature level of between about 70° and 120° F. and adjusting the volumes of the components of said blend so as to establish a desired specific gravity of the resulting composition to obtain a definite ratio of feed to diluent, and finally cooling the resulting composition to a temperature of about −100° to −200° F. and polymerizing the same with an added Friedel-Crafts catalyst.

References Cited in the file of this patent

UNITED STATES PATENTS 2,643,993     Tegge _____ June 30, 1953

FOREIGN PATENTS 697,991     Great Britain _____ Oct. 7, 1953